W. H. PARLIN.
Harrow.
No. 165,753.
Patented July 20, 1875.
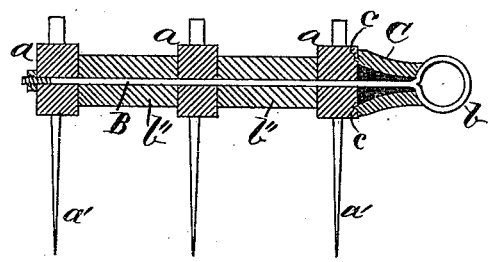
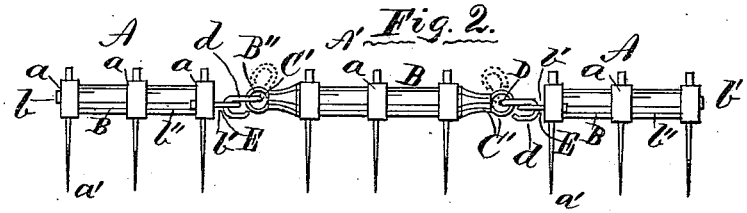
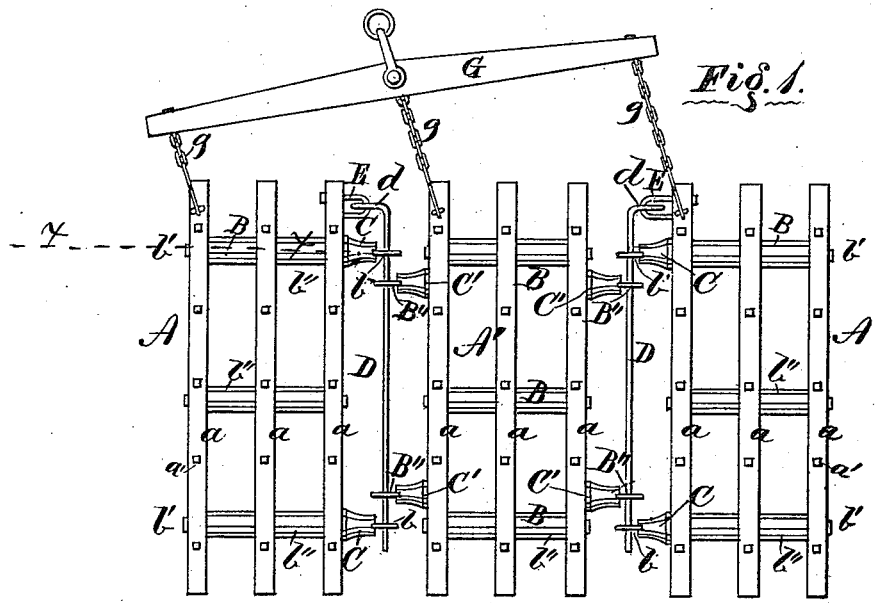
Witnesses:
James Johnson
W. D. Boone
Inventor:
William H. Parlin,
By W. B. Richards,
atty.

UNITED STATES PATENT OFFICE.

WILLIAM H. PARLIN, OF CANTON, ILLINOIS, ASSIGNOR TO PARLIN & ORENDORFF, OF SAME PLACE.

IMPROVEMENT IN HARROWS.

Specification forming part of Letters Patent No. 165,753, dated July 20, 1875; application filed May 11, 1875.

*To all whom it may concern:*

Be it known that I, WILLIAM H. PARLIN, of Canton, county of Fulton and State of Illinois, have invented certain Improvements in Harrows, of which the following is a specification:

This invention relates to improvements in that class of harrows which are made in sections, which are flexibly secured together by a rod and eyebolts, in such manner that the sections may have a reciprocating endwise motion in relation to each other; and the invention consists in constructing the pivotal rod with a hook upon its end, to engage with an eye projecting from one of the sections, for securing the rod in place and against longitudinal displacement, while at the same time it will admit of its easy removal and replacement. It further consists in an improved method of bracing the projecting eyebolts, all as hereinafter fully described.

To enable others skilled in the art to make and use my invention, I will now proceed to describe the same with reference to the accompanying drawings, in which—

Figure 1 is a top view of a harrow embodying my invention. Fig. 2 is a front elevation of the harrow. Fig. 3 is a vertical sectional view on the line $x\ x$ in Fig. 1.

Referring to the parts by letters, letters A represent the side sections, and letter A' the central section, of a harrow in three sections, each section formed of bars $a$, united by transverse rods B, having eyes $b$ on one end, and nuts $b'$ on their other ends, on the side sections, while in the center section they have heads upon one end and nuts upon the other, as shown at Fig. 1. Spools $b''$ are placed upon each rod B, for adjusting the distance between the bars $a$ in each section. The eye ends of the rods B' in the side sections and adjacent to the central section are extended, as shown at Fig. 1, and stayed by conical-shaped blocks C, the bases of which rest against the side bars $a$, and are prevented from turning by lugs $c$, and the outer ends of which are grooved vertically, and form seats for the adjacent sides of the eyes $b$, to hold them from turning and always in the necessary vertical position. Eyebolts B'' are secured to and project from the side bars $a$ of the central section, and are stayed by blocks C', in the same manner as the eyes $b$. D D are the rods for connecting the side to the central sections by simply passing it through the eyes $b$ B'', as plainly shown in the drawings. One end of each rod D is bent or formed into a hook, $d$, which, when the rod and sections are in place, may be turned to engage with a staple, E, projecting from an adjacent bar, $a$, as shown by the full lines in the drawings, and may be turned to disengage the hook, for the purpose of withdrawing the rods D when desired, as plainly shown by dotted lines at Fig. 2. G is the draft-bar, connected to each section by a separate chain, $g$, varying in length, as shown at Fig. 1, for the purpose of drawing the bars $a$, with their teeth $a'$, in a position diagonal to the line of progression.

I am aware that harrows have been constructed in sections, and pivoted to each other by eyebolts and a pivotal rod, on which they could reciprocate and vibrate in a similar manner, and which rod was held from endwise movement, but was difficult to remove, as was often required in separating the sections for loading on wagons and for other purposes; hence I do not claim such arrangement of parts; but

What I claim as new, and desire to secure by Letters Patent, is—

The harrow-sections A A', provided with stay-blocks, eyebolts, and staples, substantially as described, in combination with the rods D, having hooks $d$ on their ends, for the purpose specified.

WILLIAM H. PARLIN.

Witnesses:
   C. WILSON,
   W. J. ORENDORFF.